Sept. 3, 1957     E. J. SVENSON     2,804,749
MATERIAL WORKING APPARATUS
Filed Dec. 7, 1954     10 Sheets-Sheet 1
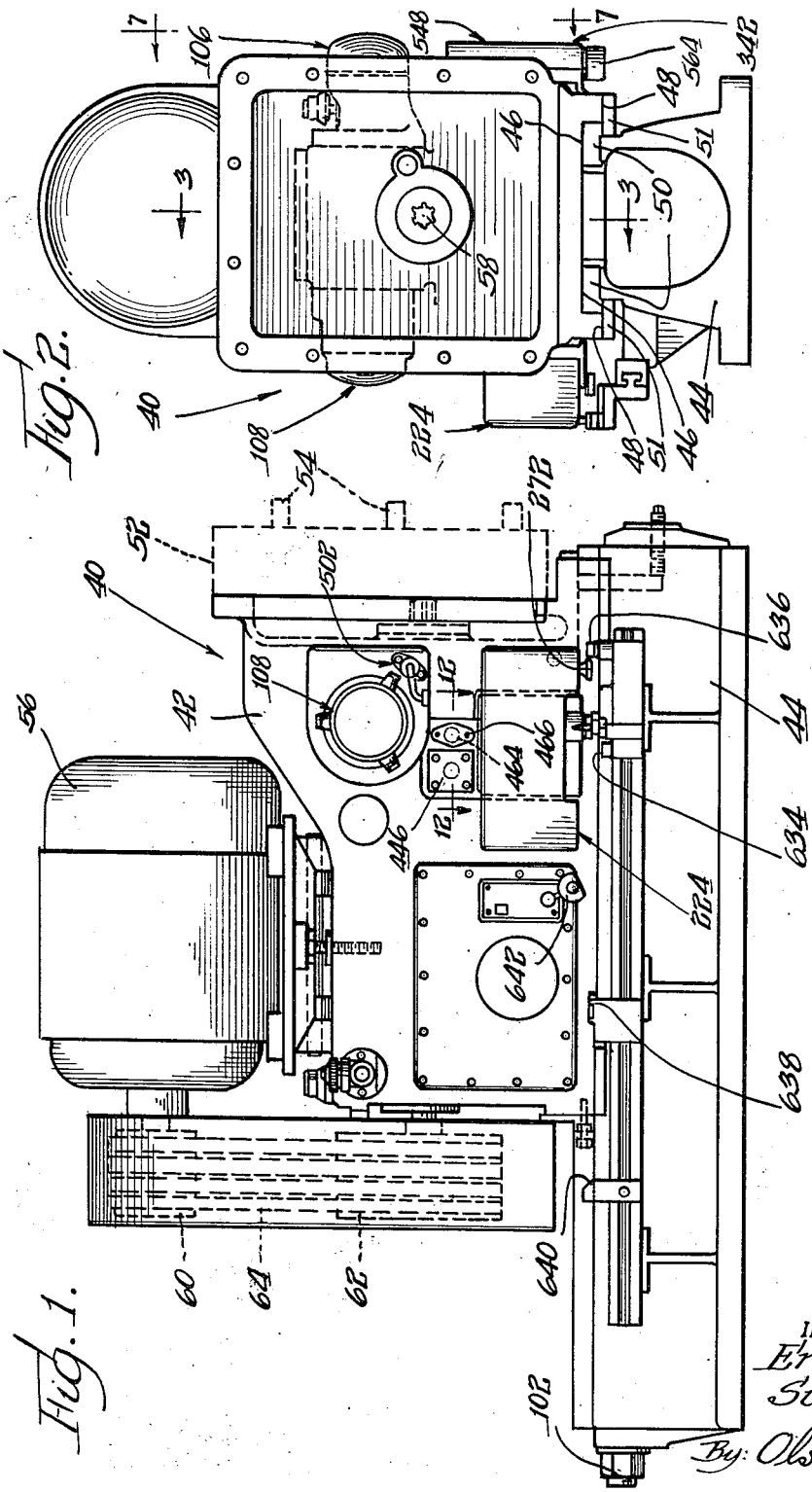
INVENTOR.
Ernest J. Svenson
By: Olson & Trexler
Attys.

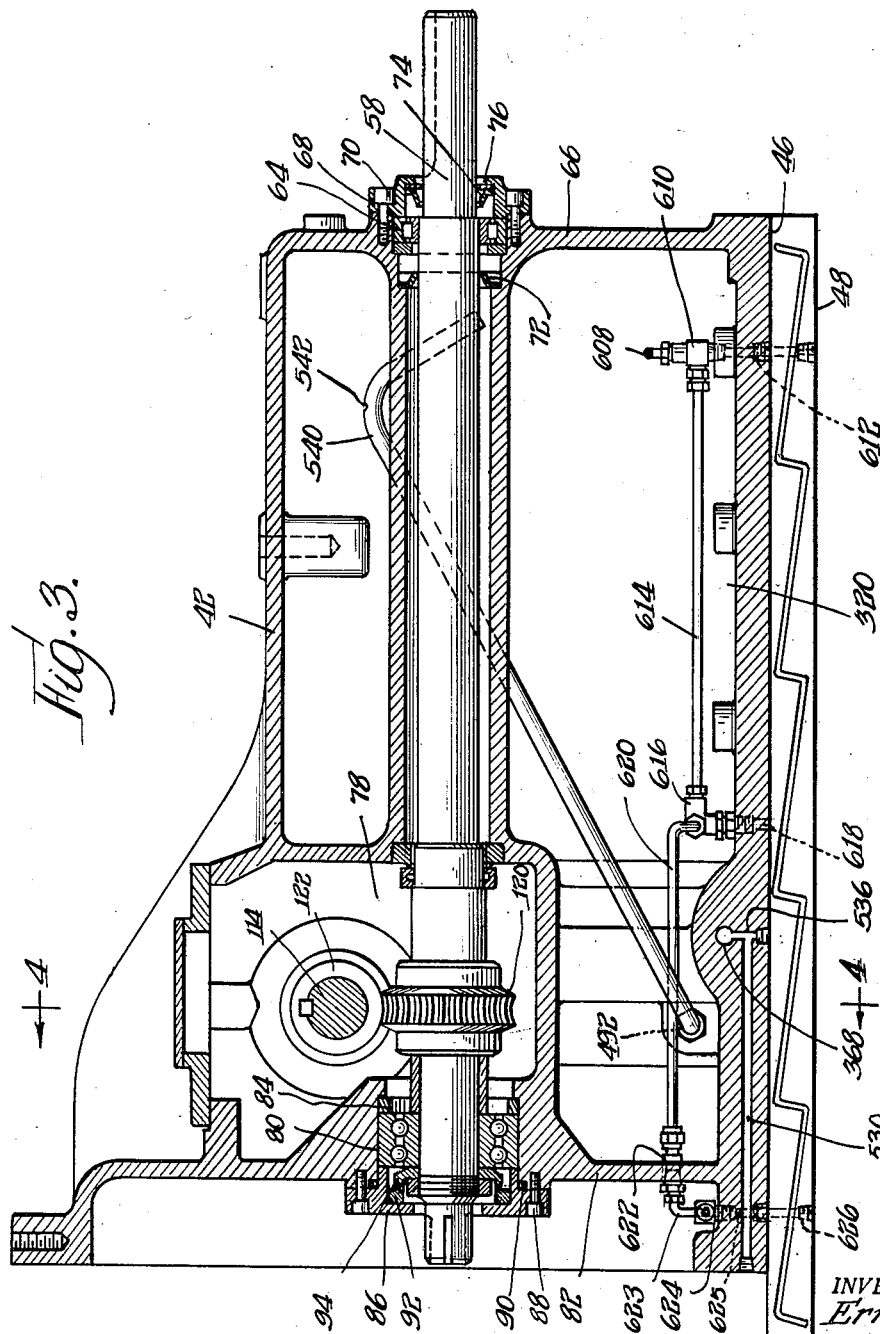

Sept. 3, 1957  E. J. SVENSON  2,804,749
MATERIAL WORKING APPARATUS
Filed Dec. 7, 1954  10 Sheets-Sheet 3
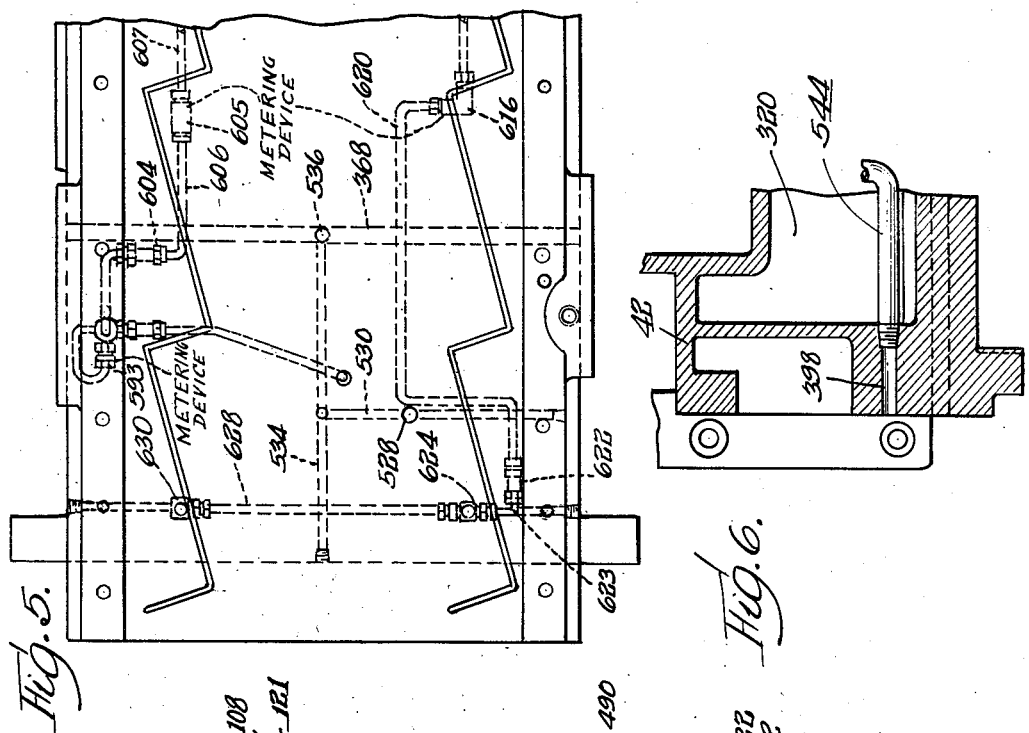
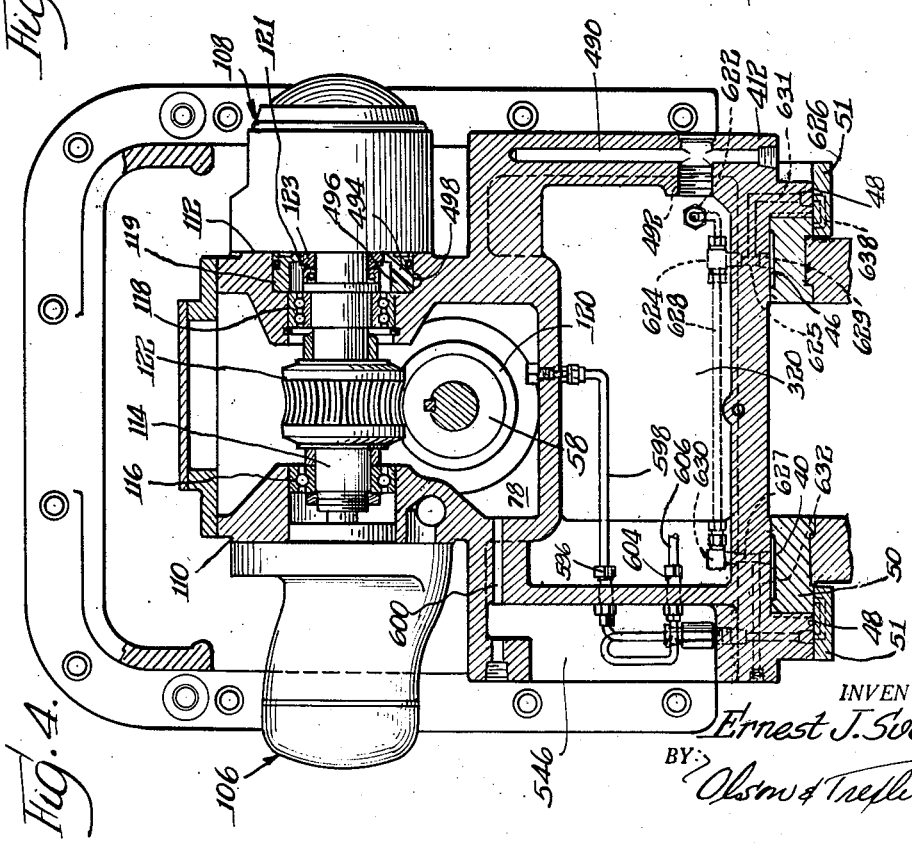
INVENTOR.
Ernest J. Svenson
BY Olson & Trexler
attys

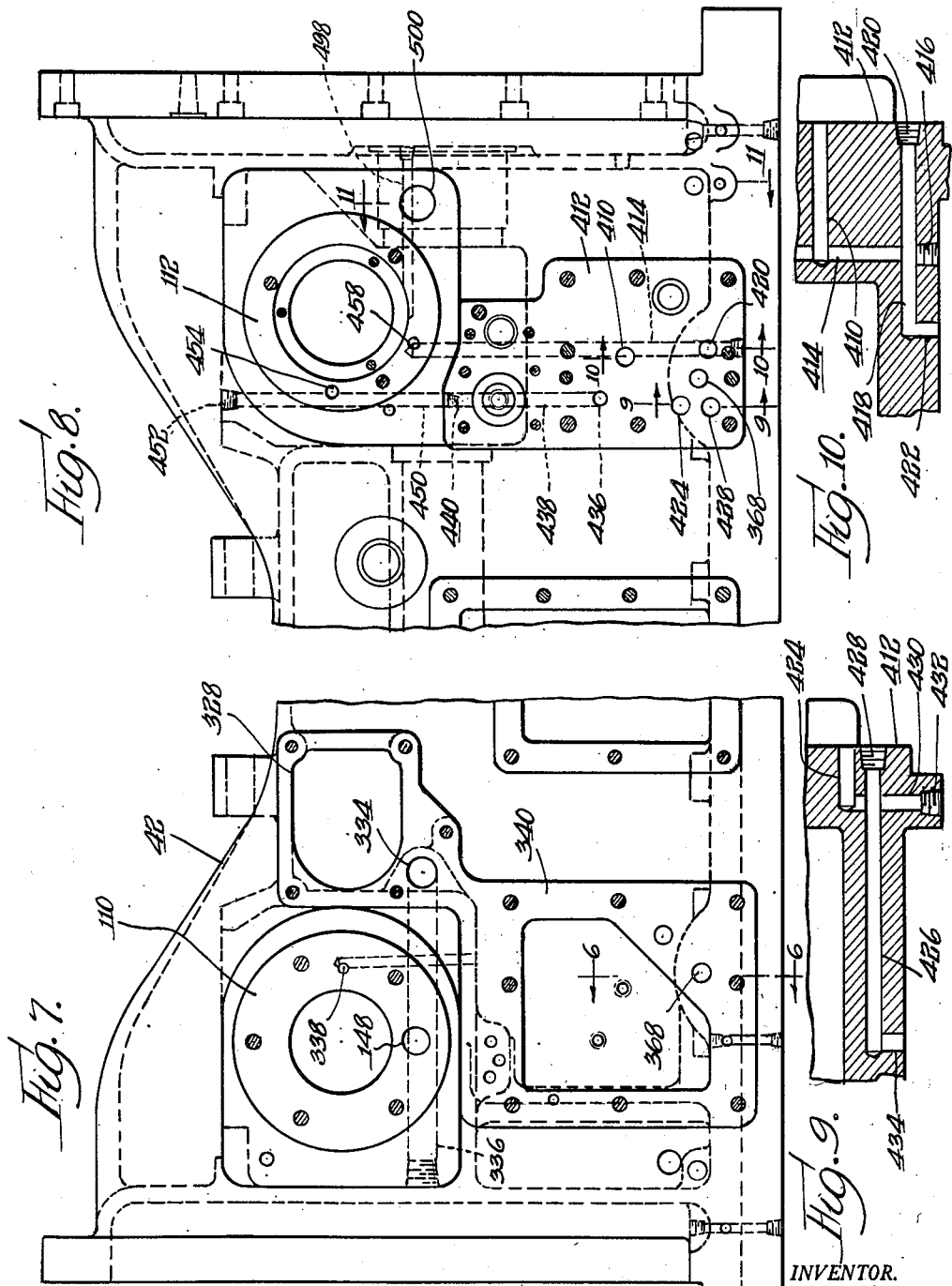

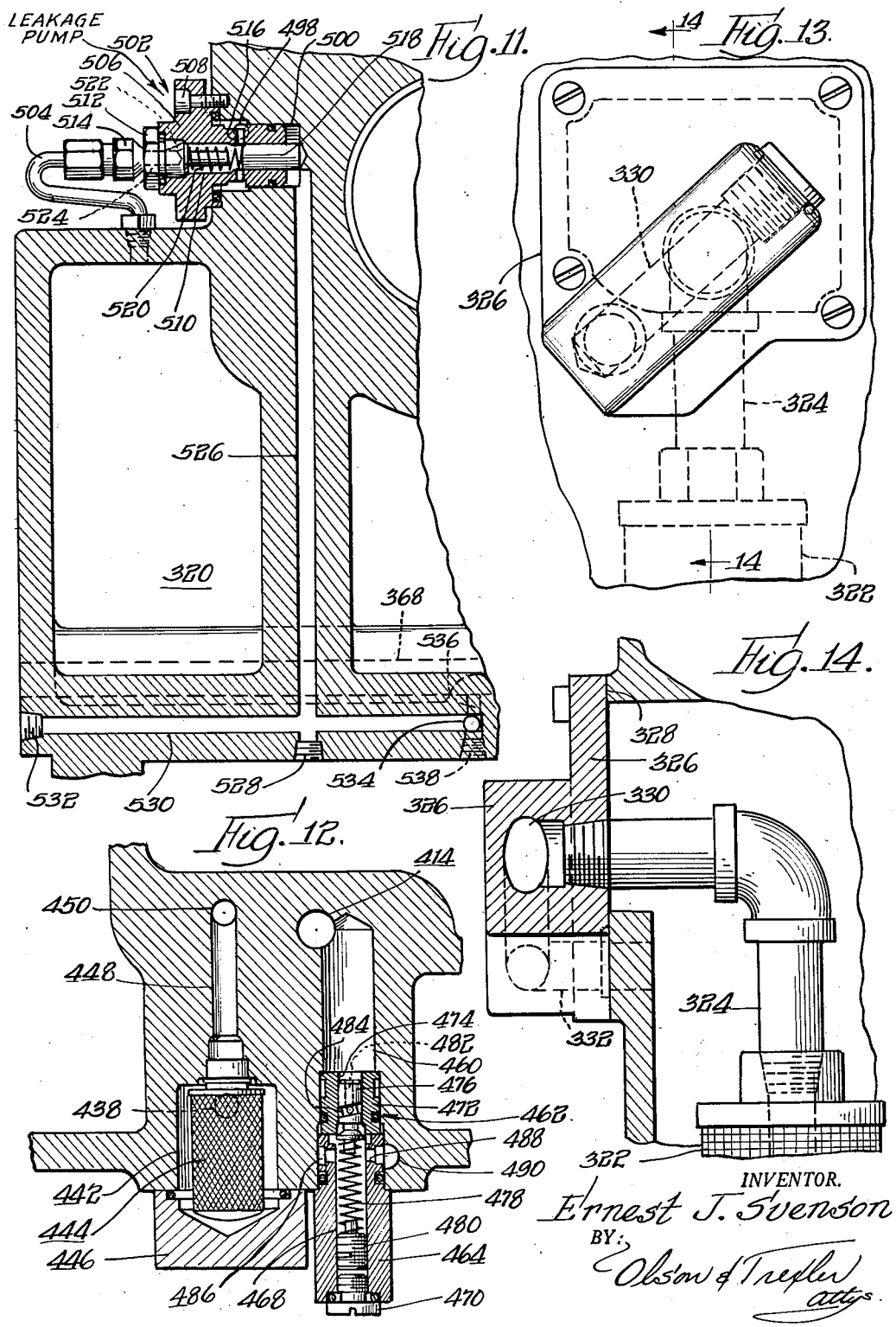

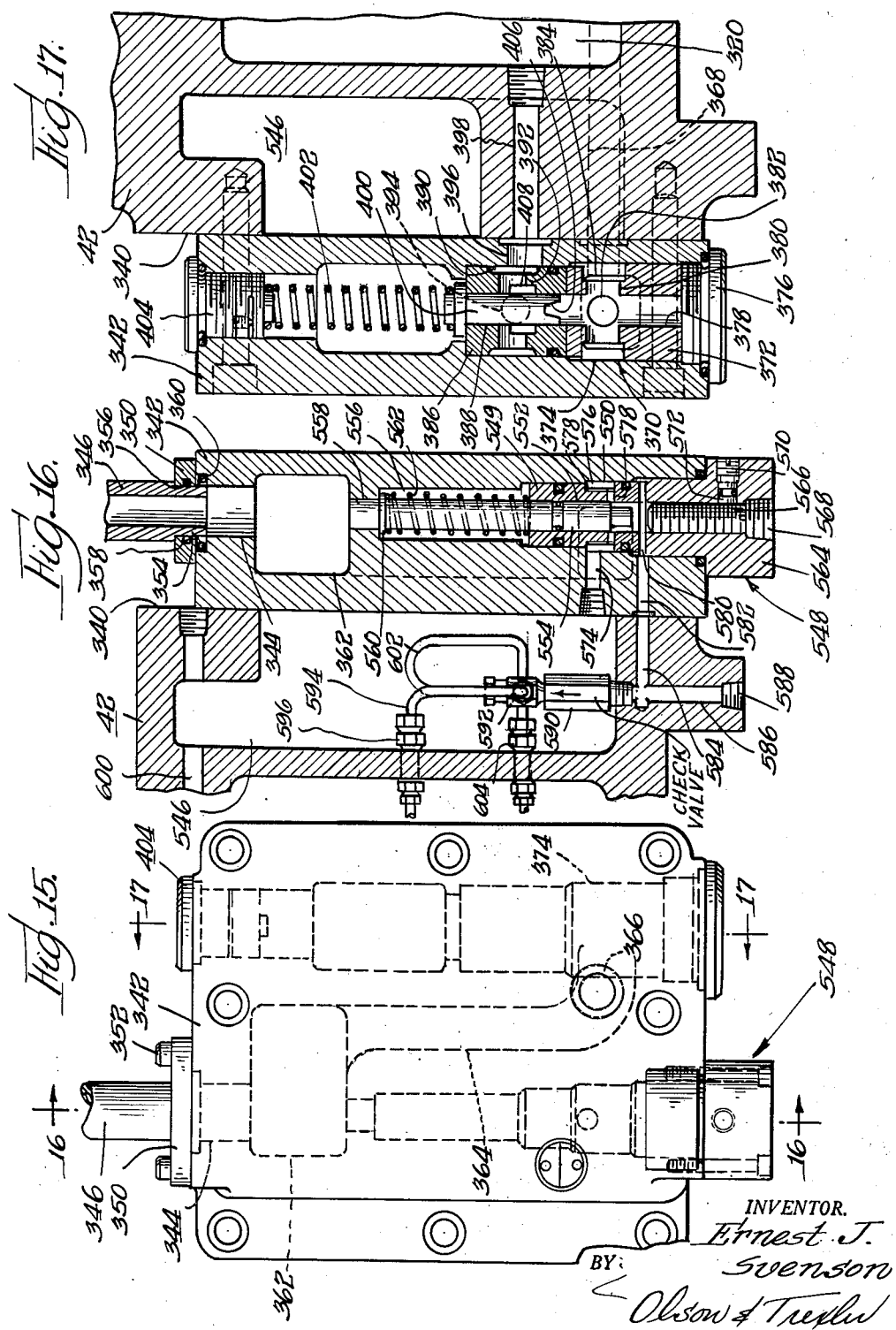

Sept. 3, 1957 E. J. SVENSON 2,804,749
MATERIAL WORKING APPARATUS
Filed Dec. 7, 1954 10 Sheets-Sheet 7
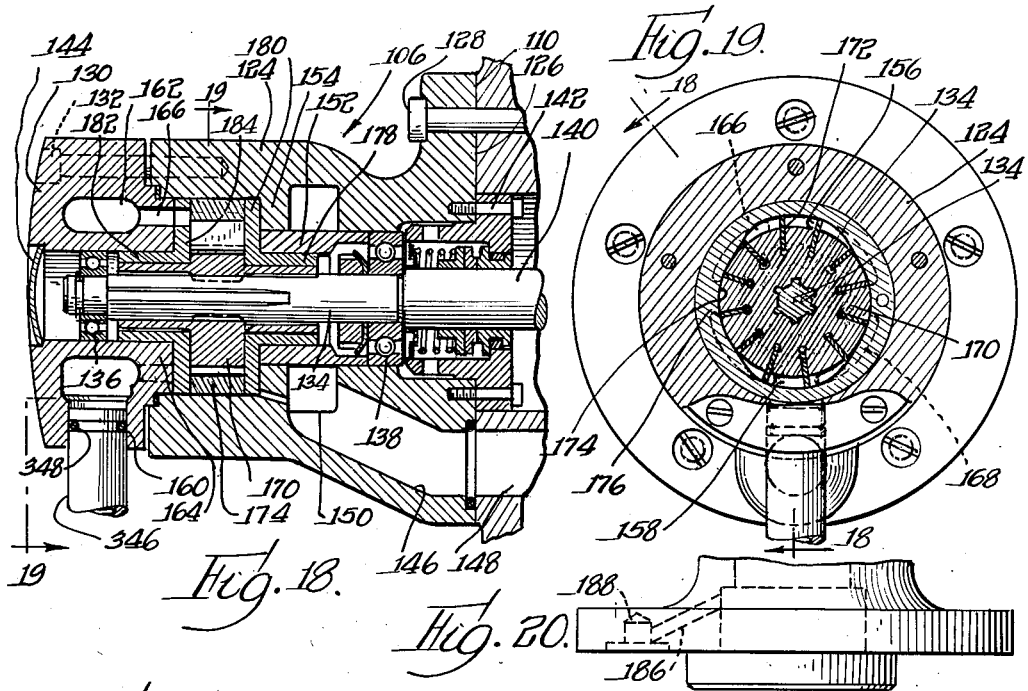
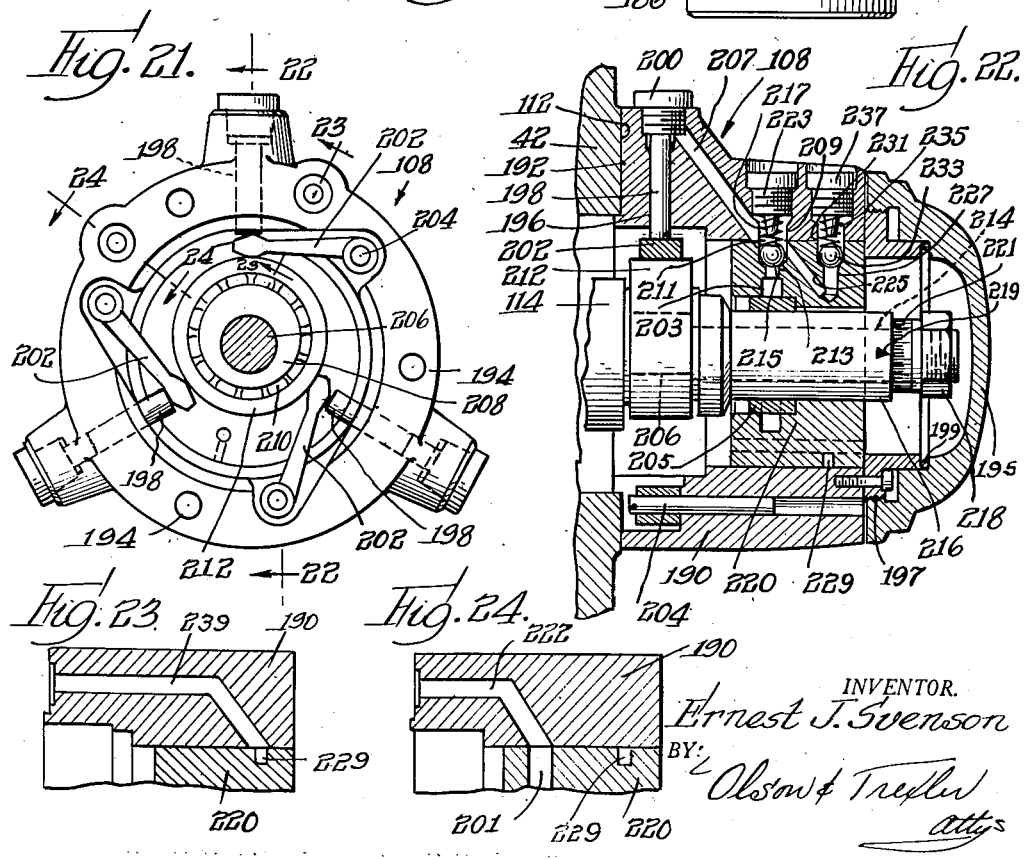
INVENTOR.
Ernest J. Svenson
BY Olson & Trexler
attys

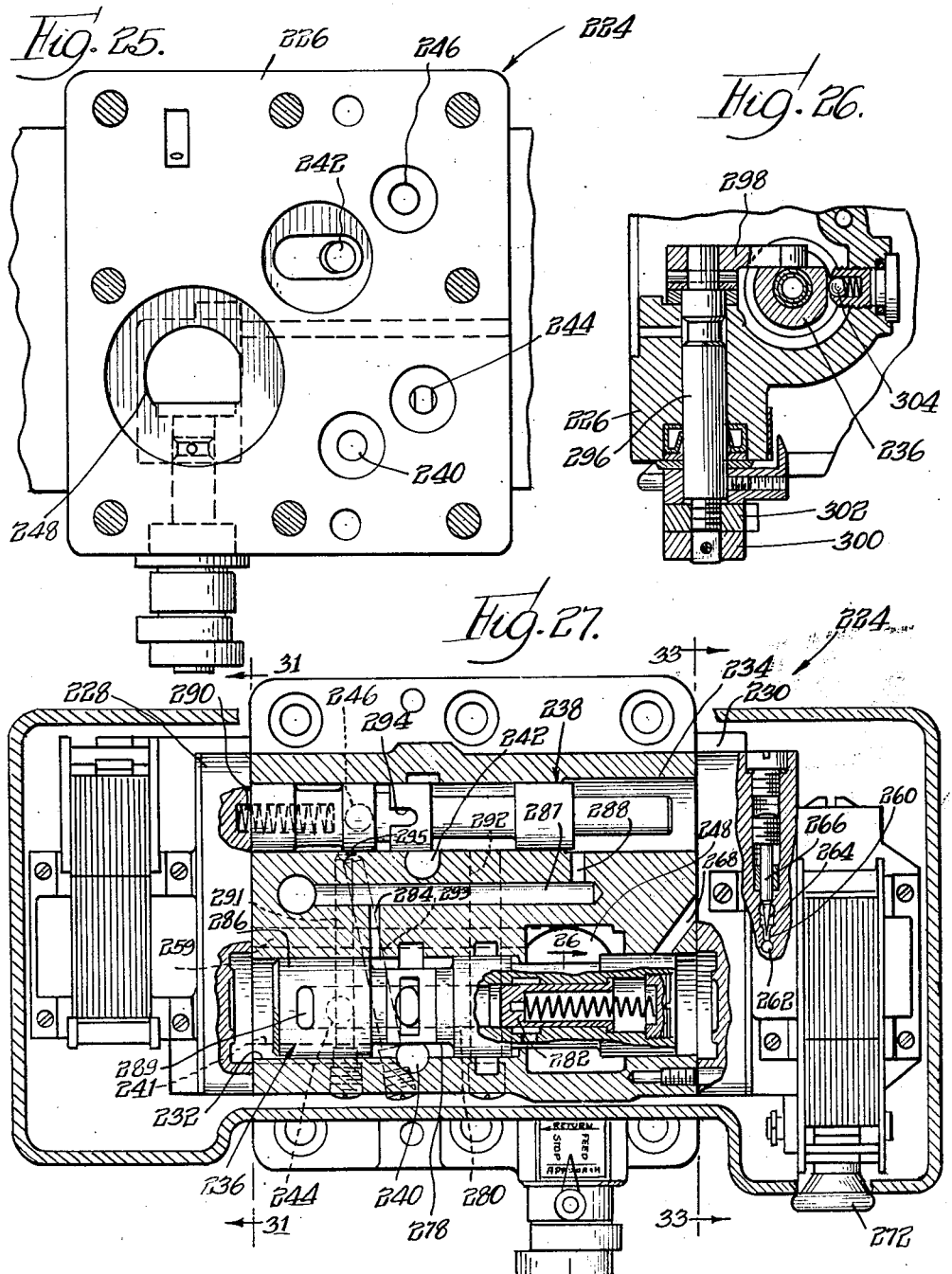

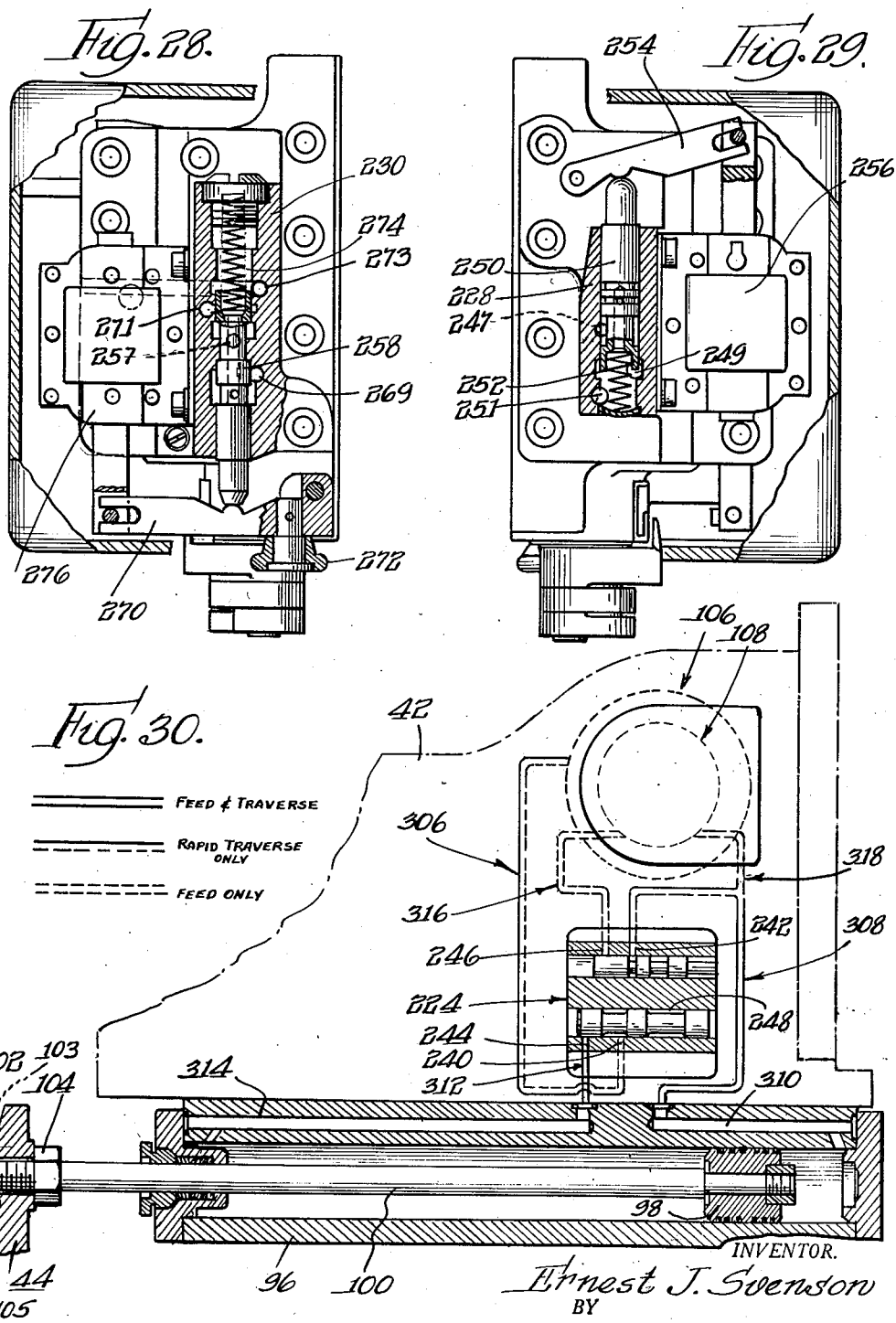

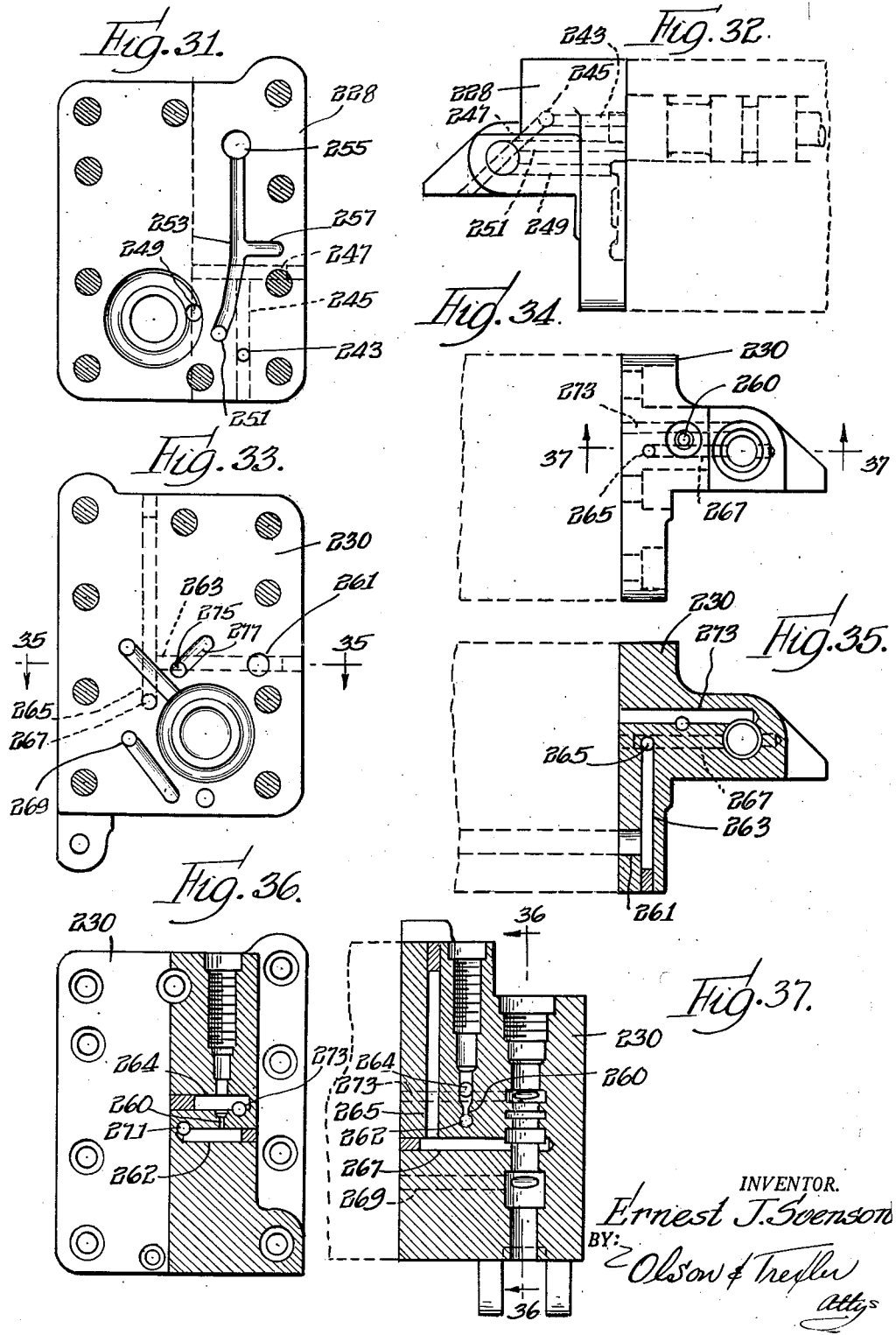

United States Patent Office 2,804,749
Patented Sept. 3, 1957

2,804,749

MATERIAL WORKING APPARATUS

Ernest J. Svenson, Rockford, Ill.

Application December 7, 1954, Serial No. 473,671

10 Claims. (Cl. 60—52)

The present invention relates to a novel metal working apparatus and more particularly, to a novel apparatus of the type generally referred to as a self-contained machine tool unit.

Batteries of self-contained machine tool units of the general type contemplated herein have been assembled in progress through machines used for various jobs where automation is applied or desired such, for example, as for drilling, boring and finishing automobile engine blocks. Such self-contained machine tool units are also adaptable for use either singly or in groups for other jobs requiring high speed operation and great accuracy. A self-contained machine tool unit is complex and in order to insure that it will function with the required accuracy, it is necessary that the elements thereof be serviced and kept in a state of good repair. Also, it is necessary to prevent overheating of the machine tool units in order to maintain the thermal expansion of the various metal elements thereof within permissible limits so that the accuracy of the machine tool unit will not be impaired, and this problem is particularly important in larger machine tool units wherein relatively great volumes of hydraulic actuating fluid under high pressure are pumped through the unit.

An object of the present invention is to provide a novel self-contained machine tool unit wherein the elements thereof are constructed and arranged so that they may be easily serviced to reduce maintenance costs and to reduce the period of time which the machine tool unit must be shut down while being serviced.

Another object of the present invention is to provide a novel machine tool unit which is constructed so that the elements thereof remain at generally uniform temperatures without overheating during operation of the unit.

A more specific object of the present invention is to provide a novel apparatus of the type set forth in the preceding paragraph wherein relatively large quantities of hydraulic actuating fluid may be pumped without unduly overheating.

Still another object of the present invention is to provide a novel self-contained machine tool unit of the above described type which is constructed so as substantially to prevent any of the hydraulic actuating fluid or lubricating fluid from leaking from the apparatus.

A further object of the present invention is to provide a novel self-contained machine tool unit of the above described type which is of relatively simple and rugged construction so that it requires a minimum of maintenance.

Other objects and advantages of the present invention will become apparent from the following description and the accompanying drawings wherein:

Fig. 1 is a side elevational view of an apparatus embodying the principles of this invention;

Fig. 2 is an end elevational view of the novel apparatus;

Fig. 3 is an enlarged sectional view taken along line 3—3 in Fig. 2;

Fig. 4 is a sectional view taken along line 4—4 in Fig. 3;

Fig. 5 is a fragmentary bottom view showing the forward portion of the machine tool unit sliding head;

Fig. 6 is a fragmentary cross sectional view taken along line 6—6 in Fig. 7;

Fig. 7 is a fragmentary side elevational view of the machine tool unit sliding head taken along line 7—7 in Fig. 2;

Fig. 8 is an elevational view similar to Fig. 7 but showing the opposite side of the sliding head;

Fig. 9 is a fragmentary cross sectional view taken along line 9—9 in Fig. 8;

Fig. 10 is a fragmentary cross sectional view taken along line 10—10 in Fig. 8;

Fig. 11 is a fragmentary cross sectional view taken along line 11—11 in Fig. 8 further showing a leakage transfer pump mounted in the sliding head;

Fig. 12 is an enlarged fragmentary sectional view taken along line 12—12 in Fig. 1;

Fig. 13 is a fragmentary side elevational view showing a cover plate which provides a portion of the hydraulic circuit mounted on the side of the sliding head;

Fig. 14 is a cross sectional view taken along line 14—14 in Fig. 13;

Fig. 15 is a side elevational view of an assembly including a cover plate or panel adapted to be secured to the side of the sliding head, a hydraulic fluid relief valve and a pump for lubricating oil; means for conducting fluid to and from said panel;

Fig. 16 is a cross sectional view taken along line 16—16 in Fig. 15;

Fig. 17 is a cross sectional view taken along line 17—17 in Fig. 15;

Fig. 18 is a sectional view taken along line 18—18 in Fig. 19 of a rotary blade or roto blade type pump including slip fitting at output for providing hydraulic actuating fluid under pressure;

Fig. 19 is a cross sectional view taken along line 19—19 in Fig. 18;

Fig. 20 is a fragmentary plan view of the rotary blade pump;

Fig. 21 is an inner end view of a piston type fluid feed pump;

Fig. 22 is a sectional view taken along line 22—22 in Fig. 21;

Fig. 23 is a fragmentary sectional view taken along line 23—23 in Fig. 21;

Fig. 24 is a fragmentary sectional view taken along line 24—24 in Fig. 21;

Fig. 25 is an elevational view showing the back of a portion of the hydraulic actuating fluid control valve body used in the apparatus of this invention;

Fig. 26 is a fragmentary sectional view taken along line 26—26 in Fig. 27;

Fig. 27 is a front elevational view of the control valve mechanism partially broken away to show certain elements in greater detail;

Fig. 28 is an end elevational view of the control valve mechanism partially broken away to show certain elements in detail;

Fig. 29 is an end elevational view similar to Fig. 28, but showing the opposite end of the control valve mechanism partially broken away to show certain elements in detail;

Fig. 30 is a simplified diagrammatic view of the hydraulic actuating circuit used in the apparatus of this invention;

Fig. 31 is a sectional view taken along line 31—31 in Fig. 27;

Fig. 32 is a fragmentary plan view of the left end of the control valve body means shown in Fig. 27;

Fig. 33 is a sectional view taken along line 33—33 in Fig. 27;

Fig. 34 is a fragmentary plan view of the right end of the control valve body means;

Fig. 35 is a fragmentary sectional view taken along line 35—35 in Fig. 33;

Fig. 36 is a fragmentary sectional view taken along line 36—36 in Fig. 37; and

Fig. 37 is a fragmentary sectional view taken along line 37—37 in Fig. 34.

Referring now more specifically to the drawings wherein like parts are designated by the same numerals throughout the various figures, a sliding head unit 40 is shown in Figs. 1 and 2 for the purpose of illustrating the present invention. As will be understood by those familiar with the art, the sliding head unit 40 may be used singly or in combination with other sliding head units in a progress through machine adapted for automation, and it may be mounted for horizontal movement, as shown, or for movement at any desired angle to the horizontal. In order to promote ready understanding of the apparatus, the various features will be described as follows:

Mechanical and supporting structures;
Traverse and feed pumps;
Control valve structure;
Hydraulic and lubricating fluid systems; and
Statement of operation.

Mechanical and supporting structures

The sliding head unit, designated generally by the numeral 40, includes a head casting 42 slidably mounted on a base structure 44 and provided with guideways 46, 48 and 51 adapted to cooperate with guideways 50 on the base structure. A spindle head 52 which is shown in broken lines in Fig. 1 and which may be of any known construction is mounted on the front face of the head casting 42 and includes any number of spindles 54. In order to drive the spindles an electric motor 56 is adjustably mounted on the head casting, which motor drives a shaft 58 through pulleys 60 and 62, respectively, mounted on the motor shaft and the shaft 58 and any number of V-belts 64. The forward end of the shaft 58 is adapted to carry a gear, not shown, which meshes with another gear or grears, also not shown, in the spindle head for driving the spindles. As shown in Fig. 3 the shaft 58 extends through the head casting 42 and is rotatably supported by bearing means 64 mounted in the rear wall 66 of the head casting and retained in position by a cap 68 secured to the rear wall by screws 70. A plurality of sealing rings 72, 74 and 76 is provided for preventing lubricant from leaking past the bearing means and out of the head casting. The forward portion of the shaft 58 extends through a gear chamber 78 provided in the head casting and is rotatably supported by bearing means 80 mounted in the forward wall 82 of the head casting. The bearing means 80 is held in position by an inner spacing ring 84 and a cap 86 which is secured to the head casting by a plurality of screws 88. An O-ring 90 is provided for preventing lubricating oil from leaking around the periphery of the cap, and a sealing ring 92 cooperates with a collar 94 on the shaft for preventing lubricating oil from leaking out around the shaft.

The sliding head casting is reciprocated by means of a fluid motor which, in the embodiment illustrated, includes a cylinder 96 secured to the bottom of the head casting as shown best in Fig. 30, and a piston 98 mounted on a rod 100. The rod 100 is fixed to the base structure 44 by a pair of nut members 102 and 104 so that the piston is fixed and the cylinder moves with the sliding head. The rear end rod extends through an oversized aperture in the base and is centered with respect to the cylinder by a nut member 103 and dowl pins 105. In order to actuate the fluid motor, the sliding head unit is provided with a rapid traverse pump 106 and a feed pump 108. These pumps are respectively mounted against finished surfaces 110 and 112 at opposite sides of the head casting as shown best in Fig. 4, and they are operatively connected with and driven by a shaft 114 which extends through the gear chamber and is rotatably mounted by bearing means 116 and 118. The bearing 118 is positioned by a retainer ring 119 which carries a sealing member 121, the face of which cooperates with a collar 123 that is sealed to shaft 114. In order to drive the shaft 114, meshing "Cone" double enveloping worm gears 120 and 122 are keyed or otherwise fixed on the shafts 58 and 114 within the gear chamber.

Traverse and feed pumps

It is contemplated that the sliding machine tool unit of the present invention will be relatively large and will have a relatively long stroke to be traversed in a short interval of time so that a large volume of hydraulic actuating fluid must be pumped per unit of time to reciprocate the head. At the same time, it is necessary to prevent undue heating of the hydraulic fluid and, therefore, the traverse pump 106 is of the rotary blade type which has the characteristic of being able to deliver a high volume of fluid with substantially less heating of the fluid than other types of pumps such for example, as gear pumps.

The rotary blade pump 106 shown sectionally in Fig. 18 includes a housing or body 124 having an end face 126 adapted to mate with the surface 110 on the head casting. The body member is secured to the head casting by means of a plurality of screws 128. The pump also includes a second body member 130 which is secured to the outer end of the body member 124 by means of a plurality of screws 132. A shaft 134 is rotatably supported within the body members by bearing assemblies 136 and 138 and an end portion 140 of this shaft extends into the head casting 42 and is connected with the shaft 114. A rotary seal assembly 142 is secured against the inner end of the body member 124 for preventing hydraulic fluid from leaking out past the shaft portion 140, and the outer end of the body member 130 is closed by a sealing disk 144.

The body member 124 is provided with a fluid inlet port 146 which communicates directly with a passageway 148 formed in the head casting. The inlet port 146 also communicates with an annular recess 150 formed in the body member 124, which recess provides, in combination with a sleeve 152 surrounding the shaft, an annular fluid chamber. The body member 124 includes an internal annular flange 154 which defines one side of the annular inlet fluid chamber, and this flange is provided with a pair of oppositely disposed elongated arcuate slots 156 and 158 as shown in Fig. 19. The body member 130 is provided with a hydraulic fluid outlet port 160 which is in horizontal alignment with the inlet port 146 and which communicates with an annular chamber 162. One wall 164 of the annular chamber is provided with oppositely disposed elongated arcuate slots 166 and 168 which are similar to but offset from the slots 156 and 158 as shown in broken lines in Fig. 19.

Mounted on the shaft 134 is a rotor member 170 which is formed with a plurality of generally radially extending slots as shown in Fig. 19 and a blade member 172 is slidably disposed within each of the slots. An annular cam member 174 is press fitted into the body member 124 and provides a generally oval-shaped cam surface 176 surrounding the rotor. An insert is provided within the body 124 at the inlet side of the rotor, which insert has an axially extending portion 178 press fitted into the sleeve 152 and a radially extending flange portion 180 disposed against the annular flange 154. The flange portion 180 is provided with elongated arcuate slots which are identical to and in alignment with the slots 156 and 158. A similar insert is provided at the outlet side of the rotor and this insert includes an axially extending portion 182 press fitted into the body member 130 and a flange portion 184 which is provided with slots identical to and registering with the elongated arcuate slots 166 and 168.

A brief description of the operation of the pump 106 is as follows. The rotor is operated at high speed so that the blades 172 are urged against the cam surface 176. The hydraulic fluid is drawn into the pump through the port 146 and passes through the annular chamber 150 and the elongated slots 156 and 158. It should be noted that these slots partially register with crescent-shaped spaces formed between the rotor and the generally oval or oblong cam surface 176. Thus, the fluid enters these spaces and is carried by the blades 172 to the opposite ends of the spaces where the blades force the fluid through the arcuate outlet slots in the flange 184 and the wall 164 of the body member 130. The fluid under pressure then enters the annular chamber 162 and flows out through the port 160.

Any fluid which leaks past the bearing assembly 138 and is trapped by the rotary seal 142 is directed by a passageway 186 to an outlet port 188 formed in the body member 124 as shown in Fig. 20. The outlet port 188 registers with a passageway provided in the head casting and is directed back to the hydraulic reservoir in the manner to be described below. For a more detailed description of the structure and operation of a rotary blade pump of the type contemplated herein, reference is hereby made to United States Patent No. 2,588,430 granted to me on March 11, 1952.

The feed pump 108 shown best in Figs. 21 and 22 includes a body member 190 having a surface 192 adapted to mate with the finished surface 112 on the head casting. The body member 190 is provided with a plurality of apertures 194 through which screws pass for mounting the body member on the head casting. Circumferentially spaced around the body member 190 are radially extending piston chambers 196 and a piston 198 is slidably disposed within each of these chambers. The outer end of each of the chambers is closed by a plug 200, and each piston extends past the inner end of its associated chamber for engagement with an actuating lever 202. Each of the actuating levers 202 is pivotally mounted to the body member 190 by a pin 204. The pistons serve to pump the fluid in a manner presently to be described and in order to actuate the pistons eccentric means is provided on the shaft 114. This eccentric means includes an eccentric crank pin 206 which may be made integral with the shaft 114 and a bearing assembly which includes an eccentric inner race 208 disposed on the crank pin 206, a plurality of ball bearings 210 and an outer race 212. A shaft end portion 214 extends from the eccentric pin portion through the body member 190, and a sleeve 216 is disposed on the shaft portion 214. The sleeve 216 is coupled with the inner race 208 by suitable pin means, not shown, and the shaft portion 214 may be slightly tapered so that by clamping the sleeve on the shaft with a nut member 218, the sleeve and thus the eccentric ball race 208 are locked against rotation relative to the shaft. It is apparent that as the shaft is rotated the eccentric bearing assembly against which the levers 202 bear force the pistons outwardly to discharge the hydraulic fluid from the pump. The pistons are subsequently forced inwardly by the pressure of the charging fluid. In the event that it is desired to change the stroke of the pistons, it is only necessary to loosen the nut 218 and turn the sleeve 216 so as to turn the eccentric bearing race 208 relative to the crank pin 206. The position to which the eccentric bearing race is adjusted may be indicated by a pointer 219 mounted on the sleeve 216 which cooperates with a graduated collar 221 slidably keyed on the shaft portion 214.

An annular body member 220 is forced fitted within the body member 190. Charging fluid is introduced into the pump through an inlet port 222 formed in the body member 190, which port is connected with a passageway 201 formed in the annular body member 220. The passageway 201 communicates with an annular recess or chamber 203 in the body member 220, which recess is closed by a sealing ring 205. Each of the piston chambers is connected with the annular chamber 203 by means of a passageway 207 formed in the body member 190 which communicates with a valve chamber provided by aligned bores 209 and 211 in the body members 190 and 220, respectively, and a radial passageway 213 in the body member 220 extending between the valve chamber and the annular chamber. In each of the valve chambers there is disposed a ball valve 215 which is resiliently pressed against the valve seat by a spring 217 acting against a plug 223 which closes the outer end of the bore 209. Thus, the charging fluid under pressure flows through the annular chamber 203 and forces the valves 215 open whereupon it flows through the passageways 207 to the piston chambers. However, when the pistons are forced outwardly the fluid which is pumped back through the passageways 207 cannot pass the valves 215. Therefore, the body member 220 is formed with a plurality of passageways 225 each of which extends between one of the bores 211 and a radially extending passageway 227. The body member 220 is provided with an annular outlet passageway 229 which intersects a plurality of valve chambers or bores 231. Each of the radial passageways 227 communicates with one of the bores 231 and a ball valve 233 is disposed within each bore 231 for preventing fluid being pumped by one of the pistons from being forced back to the other pistons. Each of the ball valves 233 is resiliently biased by spring 235 against its associated valve seat, which spring acts against a plug 237. As shown in Fig. 23, the annular outlet passageway 229 communicates with an outlet port 239 formed in the body member 190. The outer end of the feed pump is closed and sealed by means of a cover 195 threaded onto a member 197 and an O-ring 199 between the cover and member.

*Control valve structure*

The sliding head unit of the present invention is provided with a control valve 224 which includes a main body member 226 adapted to be mounted against a face on the head casting, and a pair of auxiliary end body members 228 and 230 mounted on opposite ends of the main body member. The body member 226 is provided with bores 232 and 234 in which a main valve stem 236 and a feed valve stem 238 are respectively slidably disposed. As shown in Figs. 25 and 27, the body member 226 is also provided with an inlet port 240 which is connected with the outlet of the rotary blade pump by the means described below, an outlet port 242 which is adapted to be connected with one end of the fluid motor, an outlet port 244 which is adapted to be connected to the opposite end of the fluid motor, an outlet port 246 which is adapted to be connected with the inlet of the feed pump, and a drain port 248. In Fig. 27, the main valve stem 236 is shown in a neutral or stop position and this valve stem is adapted to be shifted all the way to the right to a rapid traverse forward position, then back to a feed position between the rapid traverse forward and neutral positions, then all the way to the left to a reverse rapid traverse position, and finally back to the neutral position. Of course, the sequence of valve stem movements may be varied as desired. The main valve stem is shifted to the rapid traverse forward position by introducing fluid under pressure into the left end of the bore 232 and this fluid is controlled by a pilot valve stem 250 disposed in the body member 228. Suitable passageways are formed in the body members for connecting the pilot valve stem bore with the inlet port 240 and the left end of bore 232. As shown in Figs. 27, 29, 31 and 32, these passageways include a passageway 241 formed in the main valve body and intersecting the port 240. The passageway 241 communicates with a passageway 243 formed in the end body member 228 which passageway, in turn, connects with a vertical passageway 245. The passageway 245 intersects horizontal passageway means 247 which, in turn, intersects the pilot valve stem bore as shown best in Fig. 29. The pilot valve stem bore is also intersected by a passageway 249 which communicates with the left end of the main valve stem bore, and by a drain passageway 251 which opens at the face of the body member and communicates with groove means 253. The groove 253 also connects with a recess 255 which communicates with the left end of the feed valve stem bore 234. The branch 257 of the groove registers with a drain passageway 259 formed in the main valve body and extending to the drain port 248 as shown in Fig. 27. With the pilot valve stem in the position shown in Fig. 29, it is seen that the left end of the main valve stem bore is connected with the drain so that any fluid therein is under no pressure. Upon shifting the pilot valve stem 250 downwardly, it is seen that communication will be established between the power passageway 247 and the passageway 249 so that fluid will be introduced in the main valve stem bore to shift the main valve stem to the right toward the rapid traverse forward position. The pilot valve stem 250 is normally resiliently biased by a spring 252 to a position at which it seals the bore 232 from the fluid pressure passageway. A pivotally mounted lever 254 which is actuated by a solenoid 256 is provided for shifting the pilot valve stem to permit fluid to enter the main valve stem bore in response to an electric signal.

The main valve stem is also shifted to the reverse rapid traverse position by introducing fluid under pressure into the right end of the bore 232 and this fluid is controlled by a pilot valve stem 258 disposed in the body member 230. Passageway means is also provided in the body members for connecting the bore of the pilot valve stem 258 with the inlet port 240 and the right end of the bore 232. This passageway means includes a passageway, not shown, formed in the main valve body and extending from a point of connection with a portion of the main valve stem bore which communicates with the inlet port 240 to the right end of the main valve body for communication with a passageway 261 in the end body member 230. The passageway 261 is connected by passageways 263, 265 and 267 with the pilot valve stem bore. A drain passageway 269 communicates with a lower portion of this bore and extends for registration with a passageway, not shown, in the main valve body which, in turn, connects with the drain port 248. In certain instances it is desirable to provide a dwell at the end of the feeding movement of the sliding head unit and to accomplish this, the passageway means connecting the pilot valve stem 258 with the bore 232 includes an orifice 260 as shown in Fig. 27 which has one end connected with the pilot valve stem by passageways 262 and 271, and an opposite end connected with the etnd of the bore 232 by passageways 264 and 273. An adjustable needle valve stem 266 (Fig. 27) extends into the orifice to control the rate of fluid flow therethrough and, if desired, can be adjusted to permit the fluid to flow freely and thereby eliminate the dwell. In addition, a passageway 275 extends between the passageway 263 and a groove 277 which connects with a passageway 268 formed in the body member 226, and the passageway 268 communicates with the bore 232 at a point spaced from the end of the bore. The pilot valve 258 is adapted to be shifted to a position at which the fluid under pressure flows relatively slowly through the passageways 262 and 271, the orifice 260 and the passageways 264 and 273 until the main valve stem is shifted toward the left so as to open the passageway whereupon the fluid by-passes the orifice and the main valve stem is shifted immediately to the reverse rapid traverse position. The pilot valve stem is shifted to this position by means of a pivotally mounted lever 270 carrying a cam roller 272 which is adapted to engage a cam to be described below so as to operate the lever and shift the pilot valve stem against the action of a spring 274.

It is often desirable in instances such as when a tool breaks or cutting pressures become unduly high, to reverse the sliding head unit immediately. In order to accomplish this, the passageway 273 is extended past the orifice so that it also communicates with the bore of the pilot valve stem 258. However, the end of the passageway 273 is positioned so that it is normally closed by the pilot valve stem and so that it is necessary to shift the pilot valve stem past the above mentioned position at which the passageway 271 is opened in order to permit fluid to pass directly into the passageway 273. In order to shift the pilot valve stem 258 this additional amount, a solenoid 276 is connected with the lever 270 and suitable electrical means, not shown, which is responsive to cutting pressures is provided for energizing the solenoid.

In Fig. 27 the main feed valve stems are shown in the neutral or stop position, and in this position, the fluid under pressure entering through the inlet port 240 flows into the bore 232 around a spool portion 278 of the main valve stem, then into a central passageway 280 formed in the main valve stem and through a spring operated orifice or pressure control valve 282 into the drain port 248. In addition, fluid under pressure is maintained in passageways 284, 287 and 288 so that the feed valve stem is held in the position shown. Then in order to advance the sliding head unit, the main valve stem is shifted all the way to the right in the manner described above and in this position, the passageway 284 communicates with the fluid under pressure around the spool portion through a small passageway, not shown, formed in the end portion 286 of the main valve stem. The fluid under pressure entering the passageways 284, 287 and 288 maintains the feed valve stem toward the left against the action of a spring 290. At the same time a passageway 292 which connects the bores 232 and 234 communicates with the spool portion of the shifted main valve stem so that fluid under pressure is directed into the bore 234 and this fluid passes out through the port 242. In addition, a portion of the fluid passes through slot means 294 and out through the port 246 to charge the feed pump. The fluid under pressure leaving the port 242 is directed by the means to be described below to the fluid motor so that the sliding head unit is rapidly advanced. Fluid returning from the motor or cylinder flows through suitable passageways to be described and then into the port 244. Then the fluid passes through a slot 289 which is in alignment with the port 244, into passageway 288, and through the pressure control valve 282 into the drain ports 248. When the unit has been advanced a predetermined distance, it is desired to shift the main valve stem to the feed position and this is accomplished by the mechanical means shown best in Fig. 26. This means includes a shaft 296 rotatably mounted in the body member 226 and having a lever 298 fixed to its upper end and interconnected with the main valve stem. The lower end of the shaft 296 extends below the body member and has fixed thereto a cam 300 which is adapted to engage a fixed actuating dog which will be described below. This cam and the actuating dog cooperate to rotate the shaft 296 and thus, shift the main valve stem to the feed position. Another cam 302 is fixed on the shaft 296 for cooperation with another actuating dog to shift the main valve stem to the neutral position. A spring biased detent 304 is provided for cooperation with notches in the main valve stem to retain the valve stem in the position to which it is adjusted.

When the main valve stem has been shifted to the feed position a drain passageway, not shown, in the valve stem portion 286 is brought into alignment with the passageway 284 so that fluid may drain from the right end of the feed valve stem bore 234. The spring 290 then functions to shift the feed valve stem so as to block the port 242 whereby a major portion of the fluid under pressure from the rotary blade rapid traverse pump is cut off from the fluid motor and by-passed to the reservoir through passageway 280 and the pressure control valve 282. The piston pump then delivers fluid to one end of the fluid motor and the fluid in the opposite end of the fluid motor returns to the valve and enters port port 244. From the port 244 the fluid flows through suitable passage means 291 to the bore 234 and then out through the port 246 and back to the piston pump. As will be understood, the piston rod occupies a portion of the space within the cylinder so that there is insufficient fluid in the rear portion of the cylinder to fill the front portion. Therefore, make-up fluid is introduced into the closed feed circuit through a passageway 293 which extends from the port 240 to a very small orifice 295 opening into the bore 234. When the feeding operation is completed the main valve stem is shifted to the reverse rapid traverse position in the manner described above. In this position the inlet port 240 is connected by the spool portion of the main valve stem with the port 244 so that fluid under pressure is discharged to the port 244 and directed to the fluid motor to reverse the motion of the sliding head unit. At the same time the passageway 284 again communicates with the fluid under pressure so that the feed valve stem is shifted toward the left against the action of the spring 290 to unblock the passageway 242. The fluid returning from the fluid motor enters the passageway 242 and flows through the bore 234 and the passageway 292 into the main valve stem bore and out through the drain port.

*Hydraulic and lubricating fluid systems*

As shown diagrammatically in Fig. 30, the hydraulic system includes conduit or passageway means 306 connecting the outlet of the rotary blade pump with the inlet port 240 in the control valve, conduit or passageway means 308 connecting the port 242 in the control valve with a passageway 310 at one end of the cylinder 96 and passageway means 312 connecting the valve port 244 with a passageway 314 at the opposite end of the cylinder. In addition passageway means 316 connects the valve port 246 to the inlet of the feed pump and passageway means 318 connects the outlet of the feed pump with the passageway means 308. A hydraulic fluid reservoir 320 is provided in the head casting. A filter 322 at the end of a supply conduit 324 extends into the reservoir. The conduit 324 is also connected to a block 326 mounted against a surface 328 on the head casting. The block 326 has a diagonal passageway 330 and a port 332 which communicate with a transverse port or passageway 334 formed in the head casting as shown in Fig. 7. A longitudinally extending passageway 336 in the head casting connects the passageway 334 with the passageway 148, which passageway 148 communicates with the inlet port of the rotary blade pump as described. The head casting is also provided with a drain passageway 338 which communicates with the drain port 188 in the rotary blade pump housing for directing hydraulic fluid back to the reservoir.

Beneath the rotary blade pump the head casting is provided with a surface 340 against which the cover plate 342 is mounted by means of a plurality of screws. As shown best in Figs. 15 and 16 the cover plate 342 is provided with an inlet passageway 344 which is connected with the outlet port of the rotary blade pump by a pipe section 346. The pipe section is assembled with the rotary blade pump as shown in Fig. 18 merely by slipping it into the port 160 and an O-ring 148 is provided for preventing the hydraulic fluid from leaking through the port around the pipe section. The pipe section is somewhat similarly connected with the cover plate 342 whereby assembly or disassembly of these parts of the apparatus may be accomplished quickly and easily. More specifically, a block 350 is mounted on top of the cover plate 342 by a plurality of screws 352 and an end portion 354 of the pipe section having a reduced diameter is adapted to slip into an aperture in the block. The reduced diameter end portion provides the pipe section with a shoulder 356 which engages the upper surface of the block to limit downward movement of the pipe. An O-ring 358 is provided in the block for preventing fluid from leaking between the block and the pipe, and the O-ring 360 is provided for preventing fluid from leaking between the block and the cover plate 342.

The passageway 344 communicates with an enlarged chamber 362 in the cover plate 342, which chamber in turn communicates with a passageway 364. The passageway 364 connects with a port 366 that registers (Figs. 15 and 17) with a passageway 368 extending entirely across the head casting and communicating with the inlet port 240 in the control valve. The passageway 364 also communicates with relief valve means 370 which directs the fluid passing through the relief valve back to the hydraulic reservoir if pressure in the circuit exceeds an adjustable predetermined value. It should be noted that by returning the fluid to the reservoir rather than directly back to the inlet port of the rotary blade pump, the fluid is cooled in the reservoir before it returns to the pump so that any possibility of local portions of the fluid becoming unduly overheated is reduced.

As shown in Fig. 17 the rotary blade pump relief valve means includes a body member 372 disposed in a bore 374 in the cover plate. The lower end of the bore is closed by a plug 376. The body member 372 is provided with an axially extending bore 378 which is intersected by a pair of right angularly disposed passages 380 and 382 which completely traverse the body member and which open into an annular recess 384 provided in the body member. The recess communicates with the passageway 364 whereby the hydraulic fluid flows through the recess, the passageways 380 and 382 and into the bore 378. A second body member 386 is disposed within the bore 374 and has a central bore or passageway 388 that registers with the passageway 378. In addition, the body member 386 is provided with an annular recess 390 and a pair of right angularly disposed passages 392 and 394 which intersect the bore 388 and communicate with the recess 390. The recess 390 also communicates with a port 396 formed in the cover plate 342 and this port connects with a passageway 398 formed in the head casting for directing the fluid back to the reservoir 320. A valve member 400 is provided in the passageway 388 and is resiliently biased to the position shown in Fig. 17 by a spring 402 acting against a plug 404 so that the passageways 392 and 394 are normally blocked. The valve member is provided with a generally V-shaped notch 406 in the end thereof which, upon movement into and out of an annular chamber 408 in the body 386 provides for progressive opening and closing of the valve.

The passageway means 308 (see Figs. 8 and 10) include a passageway 410 formed in the head casting and opening at a surface 412 against which the control valve body is mounted for communication with the port 242. A vertical passageway 414 having its lower end closed by a plug 416 intersects the passageway 410. A transverse passageway 418 having its outer end closed by a plug 420 intersects the passageway 414 and also a passageway 422 which communicates with the passageway 310 in the cylinder 96. The passageway means 312 includes a passageway 424 formed in the head casting and communicating with the valve port 244. This passageway is connected with another horizontal transverse passageway 426 (Fig. 9) having an outer end closed by a plug 428 by means of a vertical passageway 430 having its bottom end closed by a plug 432. The inner end of the passageway 426 forming the terminal port of the passageway 312 intersects a short vertical passageway 434 which communicates with the passageway 314 (Fig. 30).

The passageway means 316 for connecting the valve port 246 to the inlet of the piston pump includes a transverse horizontal passageway 436 formed in the head casting as shown in Fig. 8 and adapted to communicate with the port 246. This passageway intersects a vertical passageway 438 formed in the head casting and having its upper end closed by a plug 440. As shown best in Fig. 12 the passageway 438 intersects a chamber 442 in which there is disposed a filter member 444. The outer end of the chamber is closed by a cover plate 446 secured to the surface 412 by a plurality of screws. The filter member communicates with a horizontal transverse passageway 448 formed in the head casting and this passageway intersects a vertical passageway 450 having its upper end closed by a plug 452. The vertical passageway 450 intersects another horizontal passageway 454 which opens at a surface 112 on which the piston pump is mounted by a plurality of screws. The passageway 454 registers with the inlet port of the piston pump.

The passageway means 318 which connects the outlet port of the piston pump with the passageway means 308 includes a horizontal passageway 458. The above described passageway 414 which forms a part of the passageway means 308 is extended upwardly as shown in Fig. 8 so that it intersects the passageway 458. As shown in Fig. 12 the passageway 414 also intersects a horizontal bore 460 in which high pressure relief valve means 462 is disposed. The relief valve means 462 includes a body member 464 secured to the head casting by a plurality of screws 466 as shown in Fig. 1 and having a central passageway 468 with its outer end closed by a plug 470. A second body member 472 is disposed within the bore 460 and is provided with a central passageway 474 in alignment with the passageway 468. However, the diameter of the passageway 474 is less than the diameter of the passageway 468. A valve member 476 is slidably disposed within the passageway 474 and yieldably biased to the position illustrated by a spring 478 which acts against an adjustable set screw 480. The valve member is provided with a small central passageway 482 which communicates with an annular recess 484. The annular recess is inclined with respect to the axis of the valve member so that when the valve is forced out of the passageway 474 by the fluid pressure the recess gradually opens into the passageway 468. The body member 464 is provided with an annular recess 486 which is connected to the passageway 468 by a plurality of ports 488. The recess 486 communicates with a passageway 490 formed in the head casting and, as shown in Fig. 4, the passageway 490 communicates with a drain passageway 492. This drain passageway extends between the reservoir 320 and the surface 412 and registers with the drain port 248 in the control valve body.

In order to drain any hydraulic fluid leaking into the interior of the piston pump body, a passageway 494 communicating with the interior of the pump body is provided in an insert 496 as shown in Fig. 4. The passageway 494 intersects a horizontal passageway 498 extending as shown in Fig. 8 to intersect a bore 500. As shown in Fig. 11 a pumping device 502 is disposed in the bore 500 for pumping the leakage fluid through a conduit 504 back into the reservoir 320. The pumping device includes a body member 506 which is secured to the head casting by a plurality of screws 508. The body member is provided with a central bore 510 having its outer end closed by a coupling member 512 adapted to cooperate with a check valve member 514 and suitable coupling member on the conduit 504. A plurality of transverse apertures 516 are formed in the body member to establish communication between the passageway 498 and the central passageway 510 in the body member. A piston 518 is slidably disposed within the body member 506 and is resiliently urged to the position shown by a spring 520. The piston is periodically actuated by hydraulic fluid pressure in the manner described below so as to force fluid trapped therebetween and the closed end of the coupling member 512 through a small passageway 522 in the coupling member and into a central passageway 524 in the coupling member which communicates with the check valve 514 and the conduit 504.

In order to provide hydraulic fluid for actuating the piston 518, passageway means is provided in the head casting between the bore 500 and the pressure line or passageway 368. This passageway means includes a vertical passageway 526 having its lower end closed by a plug 528 and a horizontal passageway 530 having its outer end closed by a plug 532. The passageway 530 which intersects the passageway 526 also intersects a horizontal longitudinally extending passageway 534 having a closed outer or forward end and an inner end which extends to a point beneath the passageway 368. A short vertical passageway 536 connects the passageway 534 and 368. A plug 538 is provided for closing the bottom end of the passageway 536. As will be understood, each time the main control valve stem is shifted to the neutral or stop position or to the feed position, the passageway 368 is connected through the pressure control valve 282 with the drain port in the control valve body so that a drop occurs in the fluid pressure within the passageway 368, and a corresponding drop in the fluid pressure occurs in the fluid in the passageway means connecting the passageway 368 with the bore 500. When this pressure drop occurs, the spring 520 forces the piston 518 to the position shown in Fig. 11. However, when the main control valve stem is shifted to either rapid traverse forward or return position, the fluid pressure in the passageway 368 increases and the piston 518 is shifted toward the left as viewed in Fig. 11. It is apparent that this cycle will be repeated at intervals during the operation of the apparatus.

The drain port 248 of the control valve body communicates with the passageway 492 which, as shown in Fig. 4, opens into the reservoir 320. However, in order to enable the control valve to be removed without draining the reservoir, a conduit 540 is connected to the drain passageway as shown in Fig. 3. The conduit 540 extends upwardly to a point above the level of the fluid within the reservoir and then downwardly. An orifice 542 is provided in the high point of the conduit 540 in order to prevent the hydraulic fluid from being siphoned from the reservoir when the control valve is removed from the head casting. As shown in Fig. 6, the fluid returning to the reservoir from the rotary blade pump relief valve through the drain passageway 398 also enters a conduit 544. The conduit 544 is substantially identical to the conduit 540 and, therefore, need not be set forth in detail.

The lubricating system includes a chamber 546 adapted to contain a supply of lubricating oil, which chamber is closed by the cover plate 342. As shown in Figs. 15 and 16, means 548 is provided for pumping the lubricating oil through the system. This pumping means includes a body member 549 inserted into a bore 550 in the cover plate 342 and having a central passageway 552. A piston 554 is slidably disposed in the passageway 552 and extends upwardly into a bore 556 in the cover plate. The bore 556 is connected with the chamber 362 by a passageway 558 so that the hydraulic fluid under pressure from the rotary blade pump acts against head 560 of the piston. A compression spring 562 is disposed between the body member 549 and the enlarged head 560 of the piston for raising the piston to the position shown during the periodic decreases in the hydraulic fluid pressure. As will be understood, the pressure of the hydraulic fluid will increase when the control valve is shifted to a traverse position so that the piston 554 will be forced downwardly to pump the lubricating oil to the guideways when the sliding head unit is in motion at a traverse rate.

The lower end of the bore 550 is closed by a body member 564 which member has a central threaded aperture with a screw member 566 disposed therein. This screw member serves as a stop to limit the downward movement of the piston 554 and by adjusting the position of the screw member, the piston stroke is adjusted. The lower end of the threaded aperture is closed by a pipe plug 568. In order to lock the adjusting screw 566 in the desired adjusted position, a set screw 570 is threaded into a transverse aperture in the body member 564. Preferably, a brass block 572 is disposed between the set screw and the adjusting screw so as to prevent injury to the threads on the adjusting screw. This block is provided with sealing means to prevent leakage of oil past screw 570.

Lubricating oil is directed into the pump means from the reservoir 546 through a passageway 574 formed in the cover plate 342. The passageway 574 communicates with an annular chamber provided by a reduced diameter portion 576 of the body member 549, and the body member is provided with transverse passageway means 578 connecting the chamber with the central passageway 552. A filter screen 579 covers the passageway means 578. An outlet passageway 580 is provided between the body member 549 and the member 564, which passageway communicates with a passageway 582 formed in the cover plate 342. The passageway 582 registers with a horizontal passageway 584 in the head casting which in turn is connected with a vertical passageway 586. A plug 588 closes the lower end of the vertical passageway and a check valve device 590 is connected with the upper end of the vertical passageway.

In addition to directing lubricating oil to the guideways, the lubrication pump also directs oil to the gear chamber 78. More specifically, a coupling member 592 is connected with the check valve and also with a metering unit 593 of known construction which is, in turn, connected with a conduit 594 in the lubricating oil reservoir. As shown in Fig. 16, the conduit is connected with a coupling device 596 which extends through a wall of the lubricating oil chamber, and as shown in Fig. 4, the coupling device 596 is, in turn, connected with a conduit 598 which communicates with the gear chamber. An outlet or overflow passageway 600 extends from the gear chamber back to the upper portion of the lubricating oil reservoir as shown in Fig. 4. It should be noted that this passageway is disposed above the lowermost portion of the gear 120 so that the lubricating oil is maintained within the gear chamber at a level such that the gear 120 is always partially immersed in the oil. Thus, proper lubrication of the Cone worm gears is assured even in the event that the lubricating oil pump becomes inoperative.

In order to direct lubricating oil to the guideways, a conduit 602 is also connected with the coupling device 592 through suitable connecting members, and this conduit is further connected with coupling device 604 which extends through the wall of the lubricating oil chamber 546. The coupling device 604 also communicates with conduit 606, which, as shown in Fig. 5, is bent so that it extends along one side of the head casting, and is connected to meter unit 605 which acts to meter a portion of the lubricant to the guideways through a passageway similar to 618 shown in Fig. 3, but on the opposite side of the unit. The lubricant not passed to the guideways at this point is conducted through conduit 607 connected between meter unit 605 and opposite side of the unit. Coupling device 610 is connected to the above mentioned coupling device by conduit 608 and to meter unit 616 by conduit 614. The lubricant not passed to the guideways at this point through meter unit 616 and passageway 618 is by-passed through conduit 620 to coupling device 622 which extends through wall 82.

Coupling device 622 is, in turn, connected to coupling device 624 which is connected to coupling device 630 by conduit 528. Each of the above mentioned connecting devices and meter units 605 and 616 include suitable connecting members for connection to the conduits and also for connection to the head casting.

Meter unit 616 is connected by suitable means to drilled passageway 618 shown in Fig. 3 for delivery of the lubricant metered by said unit to guideway surface 46 and upper surface of co-operating guideway 50. Meter unit 605 is similarly connected to deliver lubricant to guideways at the opposite side of the unit.

Coupling devices 610, 624, and 630 are respectively connected to suitable passageway means 612, 625, and 627, and the coupling device similar to device 610 shown in Fig. 3 but located on the opposite side of the head and not shown is connected to a passageway of similar construction. Each of these passageways extends through the head casting and has a meter unit 629 inserted near the opening of the passageway to the guideway surfaces. Each of these meter units delivers a predetermined fraction of the total lubricant pump delivery to the guideways at the opening of its respective passageway. Each of the above mentioned passageways is intersected at a point between the coupling device and the meter unit by a passageway 632 or a similar passageway drilled from the side of the unit. Each of the passageways 632 or similar is closed at its respective entering surface by means of a plug and is in turn intersected by a passageway 631 or similar passageway. At points just above the surfaces 46 meter unit 626 or similar meter units are inserted into said passageways 629 to meter lubricant into cooperating passageways 633 provided in clamp gibs 51 which conduct said lubricant to co-operating surfaces of members 50 and 51.

It is understood that the meter units referred to above may be of any construction, the preferred embodiment being of a type providing proportional deliveries to each of the points to be lubricated, thus permitting control of amount of lubricant to each of said points by a simple setting of the stroke of the lubrication pump 548.

*Statement of operation*

As will be understood, the apparatus described above is provided with a suitable electric circuit for controlling the operation of the motor 56 and the solenoids in the control valve structure. For a detailed disclosure of the structure and operation of the type of circuit which may be used with the apparatus of the present invention, reference is hereby made to Ernest J. Svenson Patent No. 2,266,829, dated December 23, 1941. As shown in Fig. 1, the apparatus is also provided with a plurality of adjustably mounted dogs for controlling the operation of the control valve structure. More specifically, the dog 634 is disposed for engagement with the cam 300 to shift the main control valve stem to the feed position, and a dog 636 is provided for engaging the roller 272 and operating the pilot valve 258 so as to shift the main valve stem to the reverse rapid traverse position. Adjacent the home or return position of the sliding head unit, there is disposed a dog 638 which is engageable with the cam 302 for shifting the main valve stem to the neutral position. In addition, there is provided a dog 640 for actuating a switch 642 on the sliding head unit, which switch is incorporated in the above mentioned electrical circuit and serves as an interlock to prevent energization of forward traverse solenoid 256 except when such switch is actuated. Of course, the electrical circuit is provided with switch means, not shown, for energizing the electric motor and the solenoid 256 for operating the pilot valve 250.

Assuming the sliding head unit to be in the home or withdrawn position, the operator initiates operation of the machine by pushing a suitably located start button, not shown, to energize the electric motor 56. As the motor begins to operate, the rapid traverse rotary blade pump begins the circulation of the hydraulic actuating fluid. At this time the main valve stem of the control valve structure is in the neutral position so that the hydraulic fluid is idly circulated to and from the reservoir. Then another switch, not shown, in the electric circuit is closed manually or automatically in accordance with the principles of automation to energize the solenoid 256 to operate the pilot valve 250 and shift the main valve stem to the rapid traverse forward position. Thereupon the hydraulic fluid under pressure from the rapid traverse rotary blade pump is directed in the manner described above to the forward end of the cylinder 96 so that the sliding head unit advances at a relatively rapid rate. As the unit approaches the forward end of the stroke, the cam 300 engages the dog 634 and the main valve stem is shifted to the feed position. This establishes a closed hydraulical circuit including the cylinder and the piston feed pump so that the sliding head unit is fed forwardly at a reduced uniform rate. As the sliding head reaches the end of the forward feeding movement, the roller 272 engages the dog 636 to operate the pilot valve stem 258. Then after a predetermined dwell period which is provided for in the manner described above or which may be eliminated, if desired, the main valve stem is shifted to the reverse rapid traverse position, whereby to direct fluid from the rotary blade pump to the rear end of the cylinder 96 so that the sliding head unit is moved at a relatively rapid rate toward its home position. As the unit approaches the home position, the cam 302 engages the dog 638 to shift the main valve stem to the neutral position. It is understood, that the electric circuit may be provided with either manually or automatically operated means for actuating the solenoid 276 and thereby shifting the pilot valve stem 258 to reverse the sliding head unit at any point during its forward motion. Thus, for example, if one of the tools should break, the sliding head unit can be immediately reversed to prevent injury to either the apparatus or the workpiece.

While the preferred embodiment of the present invention has been shown and described herein, it is obvious that many structural details may be changed without departing from the spirit and scope of the appended claims.

The invention is claimed as follows:

1. A self-contained machine tool unit comprising a head frame structure adapted to be slidably mounted on a base and having a cavity providing a hydraulic fluid reservoir as well as another cavity providing a lubricating oil reservoir, a prime mover mounted on said head frame structure for reciprocating the head frame structure, a rapid traverse pump mounted on said head frame structure for delivering a large volume of fluid, a feed pump mounted on said head frame structure, means driven by said prime mover for driving said pumps, a fluid motor connected with said head frame structure, passageway means connecting said pumps and said fluid motor, a fluid driven pumping device, passageway means connecting said lubricating oil reservoir with the inlet of said pumping device, passageway means connected with the outlet of said pumping device for directing lubricating oil to elements to be lubricated, and passageway means connecting one of said pumps with said pumping device for providing hydraulic fluid under pressure to actuate the pumping device.

2. A self-contained machine tool unit comprising a head frame structure adapted to be slidably mounted on a base and having a hydraulic fluid reservoir, a prime mover mounted on said head frame structure, a fluid motor connected with said head frame structure for reciprocating the head frame structure, a rapid traverse pump mounted on said head frame structure for delivering a large volume of fluid, a feed pump including a hollow body member mounted on said head frame structure, means driven by said prime mover for driving said pumps, passageway means in said head frame structure connecting said pumps and said fluid motor, a fluid driven pumping device mounted in said head frame structure, said head frame structure including a passageway extending between the interior of said feed pump body member and an inlet of said pumping device for directing any hydraulic fluid leaking into the interior of said body member to said pumping device, passageway means extending from an outlet of said pumping device to said hydraulic reservoir, and additional passageway means extending between said pumping device and one of said pumps for delivering hydraulic fluid under pressure to actuate the pumping device.

3. A self-contained machine tool unit comprising a head frame structure adapted to be slidably mounted on a base and having a cavity providing a hydraulic fluid reservoir, a prime mover mounted on said head frame structure, a rapid traverse pump mounted on said head frame structure for delivering a larger volume of fluid, a feed pump mounted on said head frame structure, means driven by said prime mover for driving said pumps, a fluid motor connected with said head frame structure for reciprocating the head frame structure, passageway means in said head frame structure connecting said pumps and said fluid motor, a control valve structure mounted on said head frame structure and connected in said passageway means for selectively establishing communication between said pumps and said fluid motor, said control valve structure having a drain port, and a conduit connected with said drain port and extending into said reservoir for directing fluid from the drain port into the reservoir, said conduit having a portion projecting above the hydraulic fluid within the reservoir to permit removal of the control valve structure without draining the reservoir.

4. A self-contained machine tool unit comprising a head frame structure adapted to be slidably mounted on a base and having a cavity providing a hydraulic fluid reservoir, a prime mover mounted on said head frame structure, a fluid motor connnected with said head frame structure for reciprocating the head frame structure, a rapid traverse pump mounted on said head frame structure for delivering a large volume of fluid, relief valve means connected with an outlet port of said rapid traverse pump, conduit means connected with said relief valve means for directing fluid passing through the relief valve means back into the reservoir, said conduit means having a portion extending above the fluid in said reservoir to permit the removal of the relief valve means without draining the reservoir, a feed pump mounted on said head frame structure, means driven by said prime mover for driving said pumps, and passageway means in said head frame structure connecting said pumps and said fluid motor.

5. A self-contained machine tool unit comprising a head frame structure adapted to be slidably mounted on a base having a large central cavity providing a hydraulic fluid reservoir, a prime mover mounted on said head frame structure, a fluid motor connected with said head frame structure for reciprocating the head frame structure, a rapid traverse rotary blade pump mounted on said head frame structure for delivering a large volume of fluid without unduly heating the fluid, relief valve means connected with an outlet port of said rapid traverse pump, conduit means within said head frame structure and connected with said relief valve means for directing fluid passing through the relief valve means back into the reservoir, said conduit means having a portion extending above the hydraulic fluid in said reservoir to permit removal of the relief valve means without draining the reservoir, a feed pump mounted on said head frame structure, means driven by said prime mover for driving said pumps, and passageway means in said head frame structure connecting said pumps and said fluid motor.

6. A self-contained machine tool unit comprising a head frame structure adapted to be slidably mounted on a base and having a large central cavity providing a hydraulic fluid reservoir, a prime mover mounted on said head frame structure, a fluid motor connected with said head frame structure for reciprocating said head frame structure, a rapid traverse rotary blade pump mounted on said head frame structure for delivering a large volume of fluid without unduly heating the fluid, relief valve means connected with an outlet port of said rapid traverse pump, conduit means connected with said relief valve means and extending into said reservoir for directing fluid passing through the relief valve means back into the reservoir, said conduit means having a portion extending above the hydraulic fluid within the reservoir to permit disassembly of the relief valve means without draining the reservoir, a feed pump mounted on said head frame structure, means driven by said prime mover for driving said pumps, passageway means in said head frame structure connecting said pumps and said fluid motor, a control valve structure mounted on said head frame structure and connected in said passageway means for selectively establishing communication between said pumps and said fluid motor, said control valve structure having a drain port, and a second conduit connected with said drain port and extending into said reservoir for directing fluid from the drain port into the reservoir, said second conduit having a portion projecting above the hydraulic fluid within the reservoir to permit removal of the control valve structure without draining the reservoir.

7. A self-contained machine tool unit comprising a head frame structure adapted to be slidably mounted on a base and having a central cavity providing a hydraulic fluid reservoir and a cavity opening at one side of the head frame structure providing a lubricating oil reservoir, a cover plate mounted on said head frame structure and closing said lubricating oil reservoir, a prime mover mounted on said head frame structure, a fluid motor connected with said head frame structure for reciprocating the head frame structure, a rapid traverse rotary blade pump mounted on said head frame structure for delivering a large volume of fluid without unduly heating the fluid, a feed pump mounted on said head frame structure, means driven by said prime mover for driving said pumps, passageway means connecting said pumps and said fluid motor, a portion of said passageway means being formed in said cover plate, a relief valve disposed on said cover plate and communicating with said portion of the passageway means, additional passageway means extending between said relief valve and said reservoir for directing fluid passing through the relief valve back into the reservoir, a reciprocable piston pumping device disposed in said cover plate, said cover plate having a passageway extending between said pumping device and said lubricating oil reservoir for admitting lubricating oil to the pumping device, additional passageway means connected with an outlet of said pumping device for directing lubricating oil to guideways on the head frame structure and to said pump driving means, and said portion of the passageway means in said cover plate communicating with said pumping device for providing hydraulic fluid under pressure to actuate the pumping device.

8. A self-contained machine tool unit comprising a head frame structure adapted to be slidably mounted on a base and having a central hydraulic fluid reservoir and a lubricating oil reservoir opening at one side of the head frame structure, a cover plate mounted on said head frame structure and closing said lubricating oil reservoir, a prime mover mounted on said head frame structure, a fluid motor connected with said head frame structure for reciprocating the head frame structure, a rapid traverse rotary blade pump mounted on said head frame structure for delivering a large volume of fluid under pressure without unduly heating the fluid, a pumping device including a reciprocable piston disposed within said cover plate, a lubricating oil inlet port in said cover plate extending between said lubricating oil reservoir and said pumping device, passageway means extending from an outlet of said pumping device for directing lubricating oil to elements to be lubricated, adjustable stop means in said cover plate for controlling the length of the piston stroke and the volume of lubricating oil delivered by said pumping device, a feed pump mounted on said head frame structure, means driven by said prime mover for driving said rapid traverse and feed pumps, and passageway means connecting said rapid traverse and feed pump and said fluid motor.

9. A self-contained machine tool unit comprising a head frame structure adapted to be slidably mounted on a base and having a central hydraulic fluid reservoir, a prime mover mounted on said head frame structure, a fluid motor connected with said head frame structure for reciprocating the head frame structure, a rapid transverse pump mounted on said head frame structure for delivering fluid under pressure, a feed pump mounted on said head frame structure and including a body member and a plurality of piston means, means driven by said prime mover for driving said pumps, passageway means in said head frame structure connecting said pumps and said fluid motor, another passageway means extending between the interior of said feed pump body and said reservoir for directing any hydraulic fluid leaking within the feed pump body back to the reservoir, and a pumping device disposed in said last fluid mentioned passageway means for forcing the hydraulic fluid back to the reservoir.

10. A self-contained machine tool unit comprising a head frame structure adapted to be slidably mounted on a base and having a central hydraulic fluid reservoir, a prime mover mounted on said head frame structure, a fluid motor connected with said head frame structure for reciprocating the head frame structure, a rapid traverse rotary blade pump mounted on said head frame structure for delivering a large volume of fluid under pressure without unduly heating the fluid, a feed pump mounted on said head frame structure and including a hollow body member and a plurality of piston means, means driven by said prime mover for driving said pumps, passageway means in said head frame structure connecting said pumps and said fluid motor, a pumping device mounted in said head frame structure, said pumping device including a reciprocal piston yieldably biased in one direction, said head frame structure including a passageway extending between the interior of said feed pump body member and an inlet of said pumping device for directing any hydraulic fluid leaking into the interior of said body member to said pumping device, passageway means extending from an outlet of said pumping device to said hydraulic reservoir, and additional passageway means extending between said pumping device and a portion of said first mentioned passageway means connected with the outlet of said rapid traverse pump for delivering hydraulic fluid under pressure to said pumping device to actuate said piston in the opposite direction.

References Cited in the file of this patent

UNITED STATES PATENTS

| | | |
|---|---|---|
| 2,276,358 | Vickers | Mar. 17, 1942 |
| 2,486,988 | Schafer et al. | Nov. 1, 1949 |
| 2,559,125 | Lee | July 3, 1951 |